US008377600B2

(12) United States Patent
Takahashi et al.

(10) Patent No.: US 8,377,600 B2
(45) Date of Patent: Feb. 19, 2013

(54) FUEL CELL POWER GENERATION SYSTEM AND METHOD OF OPERATING THEREOF

(75) Inventors: Shin Takahashi, Hitachi (JP); Hiromi Tokoi, Tokai (JP); Akira Gunji, Hitachinaka (JP); Toshiya Abe, Chigasaki (JP); Takeshi Saito, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/343,847

(22) Filed: Jan. 5, 2012

(65) Prior Publication Data
US 2012/0107708 A1    May 3, 2012

Related U.S. Application Data

(62) Division of application No. 11/835,454, filed on Aug. 8, 2007, now Pat. No. 8,114,546.

(30) Foreign Application Priority Data

Sep. 29, 2006    (JP) .................... 2006-267561

(51) Int. Cl.
H01M 8/06 (2006.01)
H01M 8/04 (2006.01)
H01M 8/10 (2006.01)

(52) U.S. Cl. ........ 429/423; 429/434; 429/442; 429/443; 429/495

(58) Field of Classification Search .................. 429/423, 429/436, 437, 439, 442, 495, 434, 443
See application file for complete search history.

(56) References Cited

U.S. PATENT DOCUMENTS 6,440,596 B1 *  8/2002  Ruhl et al. ................. 429/423

FOREIGN PATENT DOCUMENTS

| JP | 07263006 | * 10/1995 |
| JP | 2000-327303 | 11/2000 |
| JP | 2000327303 | * 11/2000 |
| JP | 2002-289226 | 10/2002 |
| JP | 2003-109639 | 4/2003 |
| JP | 2005-228583 | 8/2005 |
| WO | WO 2007-073387 | 6/2007 |

OTHER PUBLICATIONS

JP Office Action of Appln. No. 2006-267561 dated Mar. 21, 2012.

* cited by examiner

*Primary Examiner* — Ula C. Ruddock
*Assistant Examiner* — Thomas H. Parsons
(74) *Attorney, Agent, or Firm* — Antonelli, Terry, Stout & Kraus, LLP.

(57) ABSTRACT

A temperature adjustment member is arranged to control temperature of a reformer independently of temperature of a fuel cell module. The reformer is structured as a three-fluid heat exchanger into which a fluid is introducible whose temperature is higher or lower than exhaust-gas temperature of the fuel cell module. Then, the temperature of the reformer is controlled independently of operation temperature of the fuel cell by introducing the higher-temperature or lower-temperature fluid into the reformer. Also, a high-temperature or low-temperature gas is mixed with the module's exhaust gas, thereby adjusting temperature of the exhaust gas itself. This also controls the temperature of the reformer independently of the operation temperature of the fuel cell.

9 Claims, 11 Drawing Sheets

FUEL CELL POWER GENERATION SYSTEM AND METHOD OF OPERATING THEREOF

CROSS-REFERENCE TO RELATED APPLICATION

This application is a divisional application of U.S. application Ser. No. 11/835,454, filed Aug. 8, 2007, (now U.S. Pat. No. 8,114,546), the contents of which are incorporated herein by 5 reference.

BACKGROUND OF THE INVENTION

The present invention relates to a fuel cell power generation system including a reformer and a method of operating the same system. More particularly, it relates to a solid-oxide fuel cell power generation system where a hydrocarbon-based fuel is used as an anode gas, and a method of operating the same system.

A fuel cell is a kind of a power generation device, wherein an anode is provided on one side of the fuel cell, and a cathode is provided on the other side thereof with an electrolyte set up therebetween. Then, a fuel gas is supplied to the anode side, and an oxidant gas, which is mainly air, is supplied to the cathode side. Next, the fuel and the oxidant are electrochemically reacted with each other through the electrolyte, thereby generating electric power. In particular, researches are now being conducted concerning a solid-oxide fuel cell, which is one type of fuel cell. This is because, in this fuel cell, the operation temperature is high, i.e., 700 to 1000° C., the power generation efficiency is high, and the exhaust heat is easy reusable.

Usually, a hydrocarbon-based fuel, such as town gas, LNG, or kerosene, is supplied to the anode side of this solid-oxide fuel cell together with water vapor. $CH_4$ is regarded as the most common fuel of the hydrocarbon-based fuels. Then, as indicated by a chemical formula (1), $CH_4$ is reformed by reacting with the water vapor on the anode surface of the solid-oxide fuel cell. This reformation reaction, which is an endothermic reaction, is referred to as "internal reformation scheme", since $CH_4$ is reformed inside the solid-oxide fuel cell. It is also possible to perform temperature control over the fuel cell by taking advantage of the endothermic reaction of this internal reformation.

$$CH_4+H_2O=3H_2+CO \qquad (1)$$

Then, $H_2$ and CO, which are acquired by the reformation reaction indicated by the formula (1), react respectively with $O^{2-}$ from the cathode side as are indicated by chemical formulas (2) and (3). These processes result in acquisition of electricity and heat output.

$$H_2+O^{2-}=H_2O+2e^- \qquad (2)$$

$$CO+P^{2-}=CO_2+2e^- \qquad (3)$$

The hydrocarbon-based fuel, however, also contains higher-order hydrocarbons having larger carbon numbers than $CH_4$, such as $C_2H_6$, $C_3H_8$, and $C_4H_{10}$. If these higher-order hydrocarbons are supplied to the anode electrode with no reformation made thereto, the C component turns out to deposit. Accordingly, there exists a possibility of causing a performance degradation of the fuel cell to occur. On account of this, usually, the higher-order hydrocarbons are partially reformed up to $CH_4$, or are reformed in total amount up to $H_2$ and CO indicated by the formula (1), then being supplied to the anode in this reformed state. At this time, this reformation is performed using an external configuration appliance referred to as "reformer" which is different from the fuel cell. In this way, performing the reformation of hydrocarbon using the reformer composed of the external configuration appliance which is apart from the fuel cell is referred to as "external reformation scheme".

Concerning the reformer based on the external reformation scheme, as is described in, e.g., JP-A-2003-109639 (Abstract), an innovation is devised that a heat source for the reformation reaction is ensured by setting up the reformer in a combustion chamber where unused fuel and unused oxidant from the fuel cell are combusted.

SUMMARY OF THE INVENTION

However, in the configuration that the reformer is set up in the combustion chamber where the unused fuel and the unused oxidant from the fuel cell are combusted, it turns out that temperature of the reformer is limited by an operation condition on the fuel-cell side. On account of this, when the pre-reformation or complete reformation is required to be performed, it is difficult for the reformer side to independently perform the operation where the rate of amount of reformed gas in hydrocarbon-based fuel gas is varied. As a result, there has existed the following problem, for example: When temperature of the fuel cell is low and thus raising the temperature is required, the reformation is not sufficiently accomplished since temperature of the combustion chamber is low. Accordingly, the anode gas with a high $CH_4$ concentration is supplied to the fuel cell. Then, the fuel cell is cooled due to the endothermic reaction of the internal reformation. Consequently, raising the temperature is not promoted. Also, it turns out that a long time is needed to achieve the rated power generation. As a result, there has existed a problem that the system's usability is no good.

An object of the present invention is as follows: In a fuel cell power generation system which includes a reformer, and which heats the reformer with an exhaust gas of a fuel cell module, there are provided the fuel cell power generation system where temperature of the reformer is made controllable independently of an operation condition for the fuel cell, and a method of operating the same system.

According to an aspect of the present invention, in a fuel cell power generation system having a reformer which is heated with an exhaust gas of a fuel cell module, there is provided a temperature adjustment member for allowing temperature of the reformer to be controlled independently of temperature of the fuel cell module.

According to another aspect of the present invention, there is provided a method of operating the fuel cell power generation system where the temperature of the reformer is controlled by activating the temperature adjustment member in response to the temperature or load of the fuel cell module.

According to the present invention, it becomes possible to independently control the temperature of the reformer regardless of an operation condition for the fuel cell.

Other objects, features and advantages of the invention will become apparent from the following description of the embodiments of the invention taken in conjunction with the accompanying drawings.

DESCRIPTION OF THE EMBODIMENTS

Figure 1:
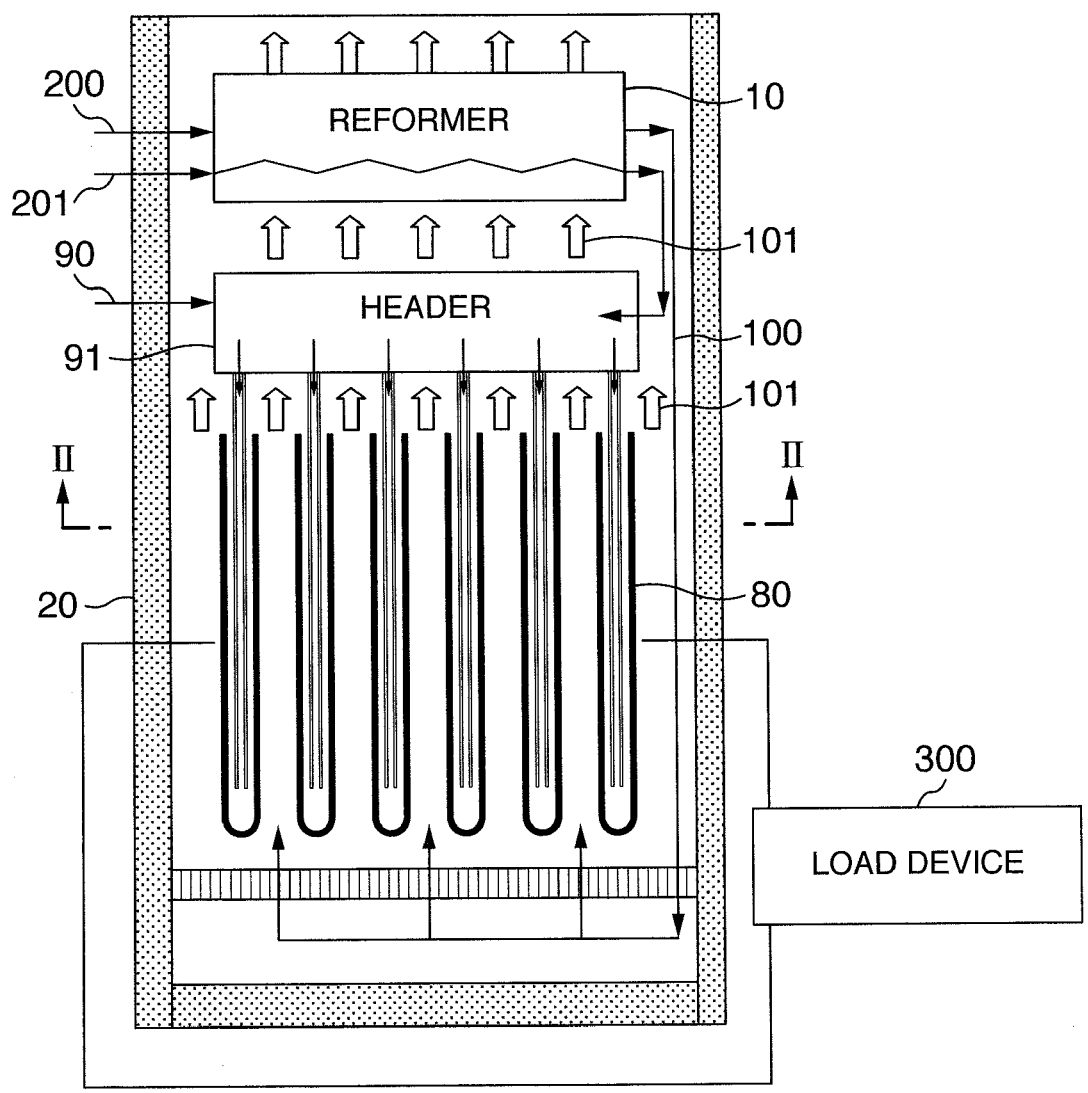
FIG. 1 is a schematic configuration diagram of a solid-oxide fuel cell power generation system according to an embodiment of the present invention.

In the present invention, it is desirable that the reformer is configured to include a three-fluid heat exchanger which can introduce a fluid having higher or lower temperature than an exhaust gas temperature of the fuel cell module. By introducing, into the reformer, the fluid whose temperature is higher or lower than the temperature of the exhaust gas, it becomes possible to make the temperature of the reformer controllable independently of the operation condition for the fuel cell. Namely, the fluid whose temperature is higher or lower than the temperature of the exhaust gas functions as the temperature adjustment member.

In the reformer having a function of the three-fluid heat exchanger, the hydrocarbon-based fuel to be reformed is reformed under the temperature of both the exhaust gas of the fuel cell module and the fluid whose temperature is higher or lower than the temperature of the exhaust gas. As an example, when the operation temperature of the fuel cell is low and thus raising the temperature is wished to be performed, it is preferable to introduce, into the reformer, a fluid whose temperature is higher than the exhaust-gas temperature. As a result, the reformation proceeds sufficiently, which heightens the $H_2$ concentration. This lowers the hydrocarbon concentration of the anode gas, thereby suppressing the internal reformation in the fuel cell module. Consequently, the operation temperature of the fuel cell is raised. On the other hand, when the operation temperature of the fuel cell becomes too high and thus lowering the temperature is wished to be performed, it is preferable to supply, to the reformer, a fluid whose temperature is lower than the exhaust-gas temperature. As a result, the reformation reaction by the reformer is suppressed and the $CH_4$ concentration is increased. Accordingly, the anode gas with the high $CH_4$ concentration is supplied to the cell, and thus it becomes easier for the internal reformation to proceed. Consequently, the fuel cell is cooled due to the endothermic reaction of the internal reformation.

Instead of the reformer having the function of the three-fluid heat exchanger, the following configuration of the reformer is also available. The use of a high-temperature or low-temperature fluid allows the reformer to be heated or cooled from the surroundings thereof. In this configuration as well, the temperature adjustment of the reformer is executable enough.

Also, a high-temperature or low-temperature gas is mixed with the exhaust gas of the fuel cell module, thereby controlling the temperature of the exhaust gas itself. This also makes it possible to adjust the temperature of the reformer independently of the operation temperature of the fuel cell.

According to the present invention, the above-described temperature adjustment member allows implementation of the operation method of controlling the temperature of the reformer in response to the temperature or load of the fuel cell module. Also, the temperature adjustment member allows implementation of an operation method of controlling the temperature raising/lowering speed of the module. Also, the temperature adjustment member allows implementation of an operation method of performing the following control. While the temperature of the fuel cell module is monitored, if there arises need of lowering the module temperature, the temperature of the reformer is lowered to increase the $CH_4$ concentration. If, conversely, there arises need of raising the module temperature, the temperature of the reformer is raised to decrease the $CH_4$ concentration.

In the fuel cell power generation system of the present invention and the method of operating the same system, there is provided the structure which makes it possible to independently control the reformer temperature regardless of the operation condition for the fuel cell. This feature makes it easy to control the temperature raising/lowering speed of the fuel cell, thereby bringing about an effect of being capable of enhancing the usability of the system. Also, in the solid-oxide fuel cell power generation system, usually, the $H_2$ line is provided to supply $H_2$ to the anode side at the time of raising the module temperature, thereby accelerating the power generation. In the present invention, however, there exists an effect that the $H_2$ line can be made unnecessary. Also, $N_2$ and $H_2$ are purged to the anode side at the time of lowering the module temperature, thereby forming a reducing atmosphere to prevent oxidation of the anode. In the present invention, however, this line can also be made unnecessary. This feature brings about an effect of being capable of implementing simplification of the system.

Hereinafter, the explanation will be given below concerning embodiments of the present invention. The present invention, however, is not limited to these embodiments.

[Embodiment 1]

Figure 2:
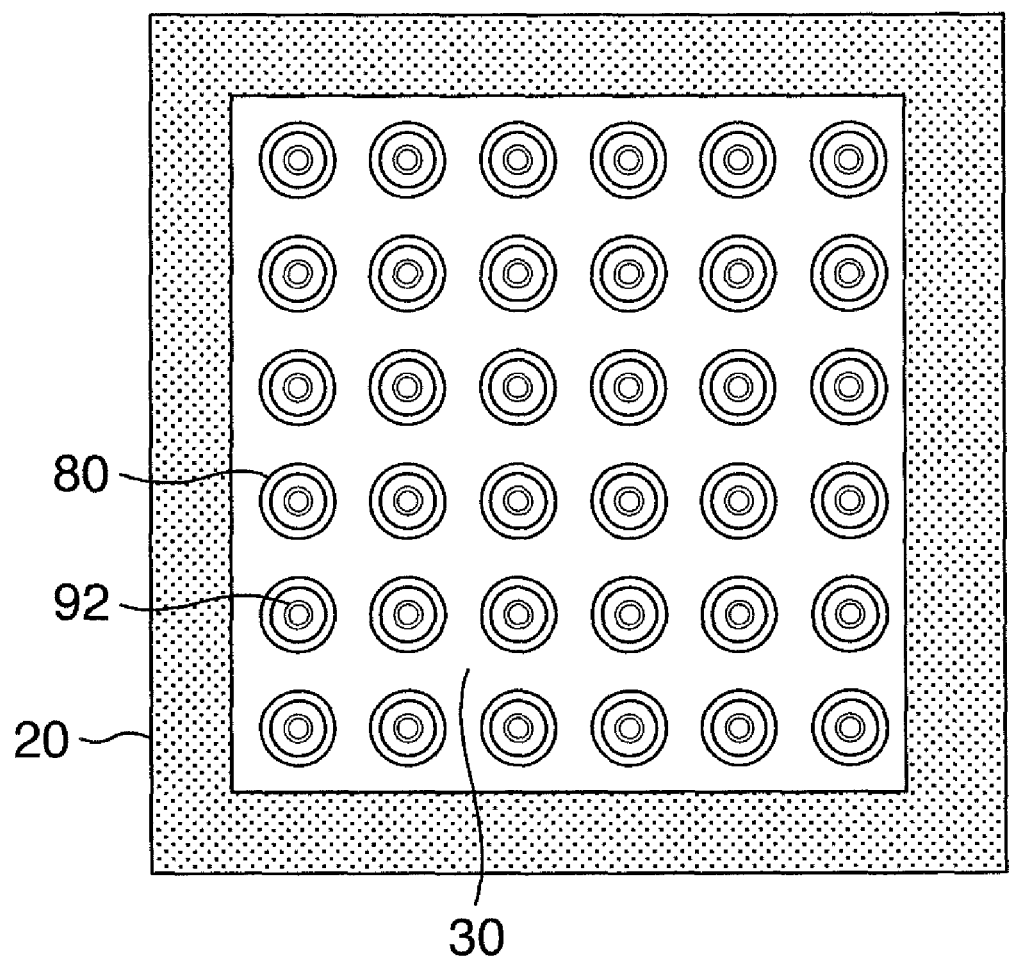
FIG. 2 is an A-A' cross-sectional diagram of FIG. 1.
Figure 3:
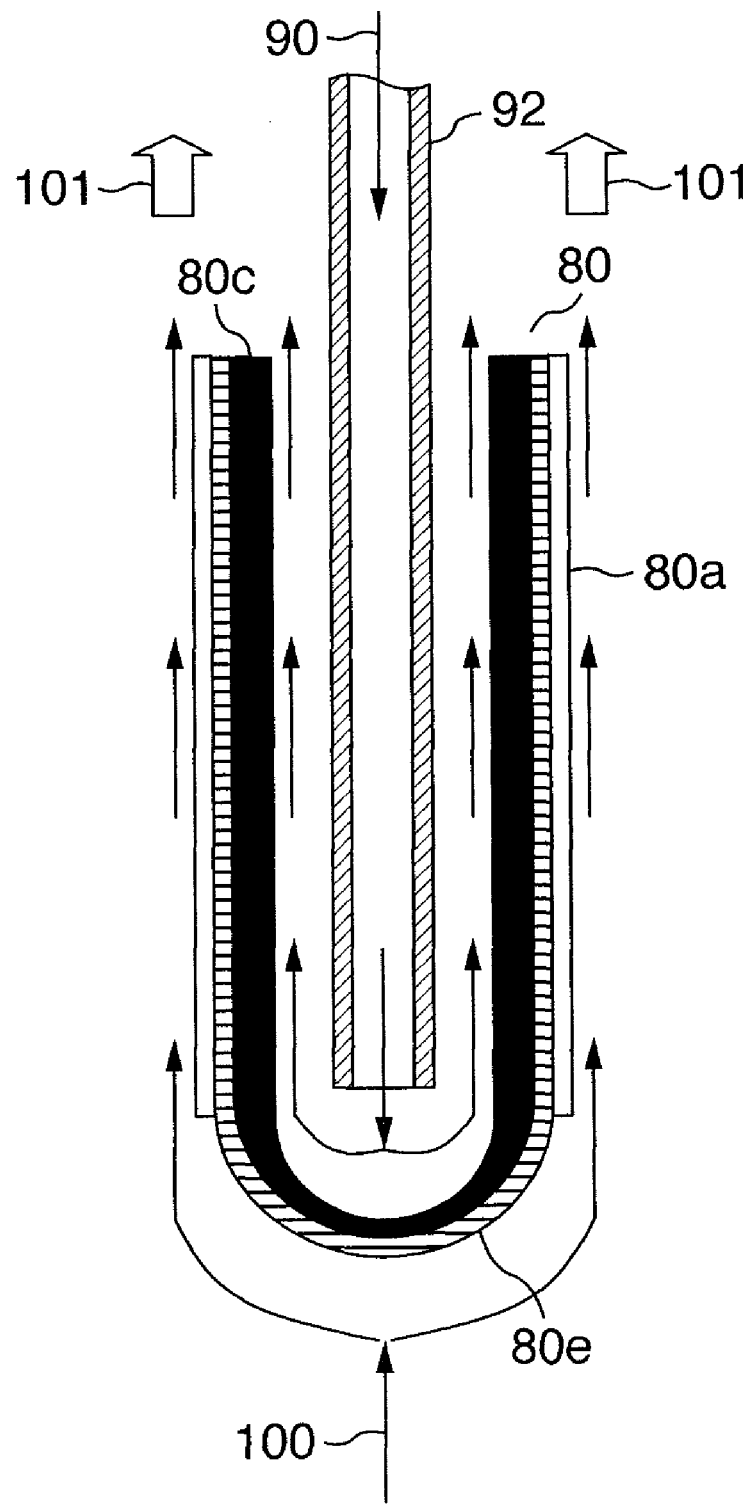
FIG. 3 is a cross-sectional diagram for illustrating the structure of a solid-oxide fuel cell.

FIG. 1 illustrates a schematic configuration diagram of a solid-oxide fuel cell power generation system according to an embodiment of the present invention. FIG. 2 illustrates an A-A' cross-sectional diagram of FIG. 1. FIG. 3 illustrates the structure of a solid-oxide fuel cell. The solid-oxide fuel cell power generation system according to the present embodiment includes a module 30, which is an assembly of fuel cells 80, inside an adiabatic container 20, and a header 91 for equally distributing a cathode gas 90 to each cell. Here, the header 91 is positioned above the module 30, i.e., on the downstream side in the direction in which an exhaust gas 101 will flow. Also, a reformer 10 is disposed above the header 91.

The feature of the embodiment 1 of the present invention is as follows: Temperature of the reformer 10 is made controllable independently of temperature of the fuel cells 80 by providing a fluid line 201 onto the reformer 10. In FIG. 2, the fuel cell module having thirty-six fuel cells 80 is illustrated for convenience. Usually, however, a few tens to a few hundred of cells 80 are assembled and multilayered in series or parallel to configure a fuel cell module for performing power generation. The assembly obtained by assembling the fuel cells in this way is referred to as "the module 30". Each fuel cell 80 in the present embodiment includes an anode 80a outside a cylinder-shaped solid-oxide electrolyte 80e, and a cathode 80c inside the electrolyte 80e.

In FIG. 3, the directions in which an anode gas and the cathode gas 90 will flow are represented by the arrows. On the cathode side of each fuel cell 80, an oxidant gas, which is usually air, is flown as the cathode gas 90. This cathode gas 90 passes through the header 91 for equally distributing the cathode gas 90 to each cell. Then, the gas 90 passes through an air introduction pipe 92, thus reaching the cathode 80c. Meanwhile, on the anode side, usually, a gas is produced by mixing a hydrocarbon-based fuel, such as town gas, LNG, or kerosene, with water vapor. This gas produced, i.e., a to-be-reformed gas 200, is subjected to the pre-reformation or complete steam reformation by the reformer 10 in accordance with the formula (1), thereby becoming a reformed gas. Then, this reformed gas is supplied to the anode side as the anode gas 100.

The cathode gas 90 and the anode gas 100 supplied to each fuel cell 80 in this way are electrochemically reacted with each other in accordance with the reaction formulas indicated by the formulas (2) and (3). This reaction brings about generation of electricity and heat. The heat generated at this time maintains each fuel cell 80 at 700 to 1000° C., i.e., its operation temperature. Also, the thermal insulating container 20, which surrounds the module 30, suppresses dissipation of the heat. Unused (oxidant) amount of the cathode gas 90 and unused (fuel) amount of the anode gas 100 are combusted, thereby becoming the exhaust gas 101.

Figure 4:
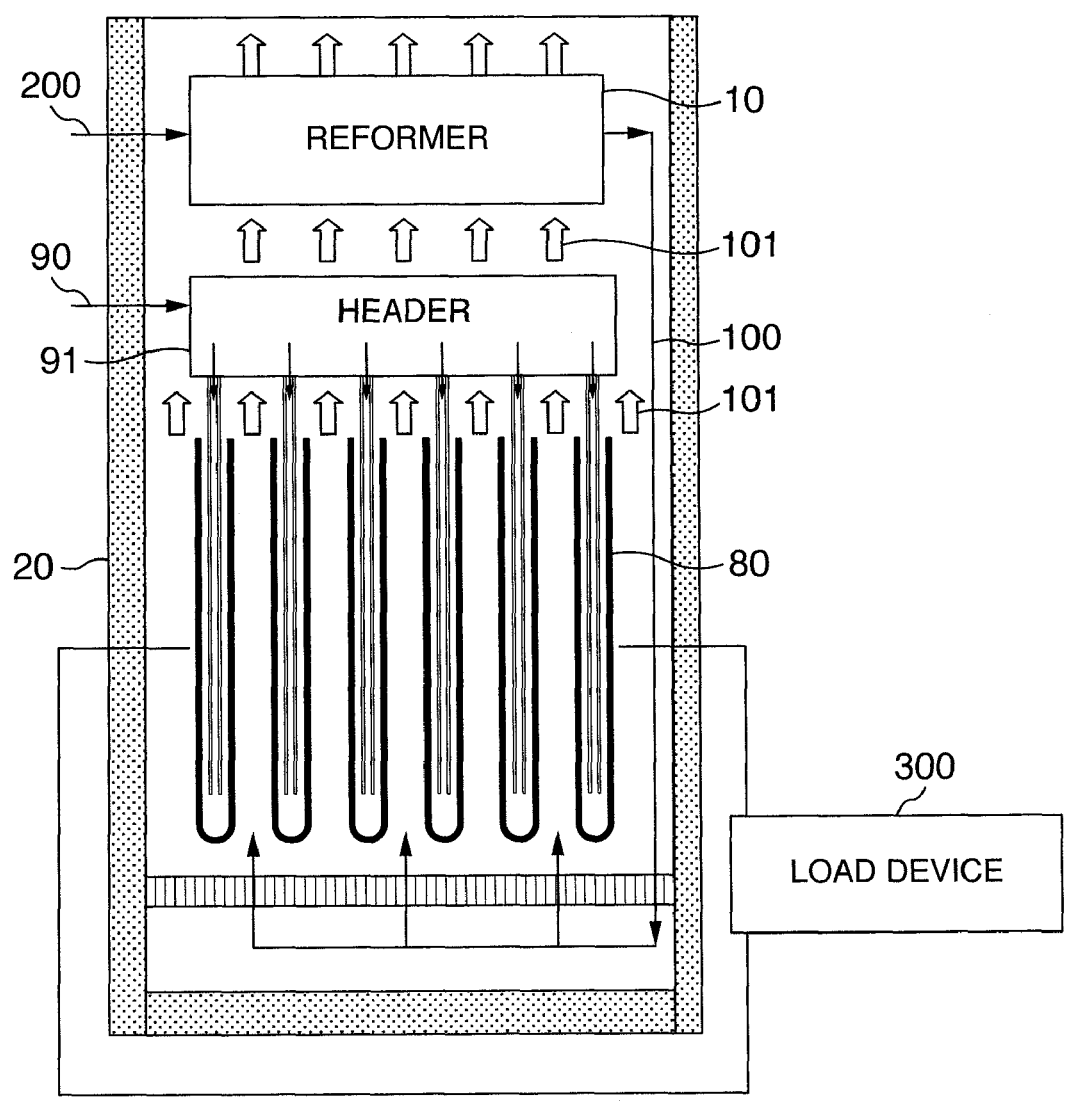
FIG. 4 is a configuration diagram of a solid-oxide fuel cell power generation system which includes a reformer for performing reformation with an exhaust gas alone.

In the case where the reformer 10 is a reformer for performing the reformation under the temperature from the exhaust gas 101 of the fuel cell module 30 alone, i.e., in the case of a configuration of the power generation system illustrated in FIG. 4, it turns out that the reformer 10 collects heat of the exhaust gas 101 to use the heat as a heat source for the reformation reaction (endothermic reaction).

Figure 5:
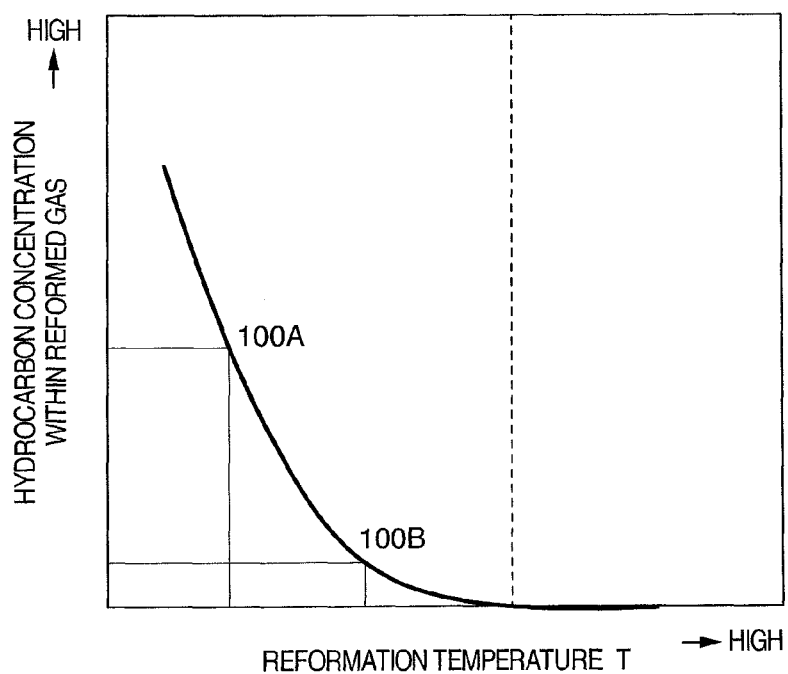
FIG. 5 is a characteristic diagram for illustrating the relationship between hydrocarbon concentration within a reformed gas and reformation temperature.

However, when power generation amount of each fuel cell 80 is small like the time of starting temperature raising or the time in the middle of the temperature raising, temperature of the exhaust gas 101 is low, since temperature of each fuel cell 80 is low. On account of this, temperature of the reformer 10 is low, and thus the reformation is not sufficiently accomplished. As a result, as is apparent from a relationship diagram between hydrocarbon concentration within the reformed gas and reformation temperature, which is illustrated in FIG. 5, it turns out that an anode gas 100A with a high hydrocarbon concentration, i.e., a high $CH_4$ concentration, is supplied to the fuel cell. Then, the fuel cell is cooled due to the endothermic reaction of the internal reformation. As a consequence, eventually, raising the temperature is not promoted. In this scheme, it turns out that a long time is needed until rated power generation is implemented. Consequently, the system's ease-of-use is no good.

Also, conversely, when the temperature of each fuel cell 80 is required to be lowered, the temperature of the reformer 10 is high at this time. As a result, it turns out that an anode gas 100B with a low $CH_4$ concentration is supplied to the fuel cell. Accordingly, the endothermic (i.e., cooling) effect caused by the internal reformation of each fuel cell 80 cannot be obtained. Consequently, there exists a problem that the temperature control becomes difficult to accomplish.

In contrast thereto, in the present invention, the temperature of the reformer 10 is made controllable independently of the temperature of each fuel cell 80 by allowing a high-temperature or low-temperature fluid to flow to the reformer 10 from the fluid line 201. When the temperature of the fuel cell is required to be raised, the high-temperature fluid is supplied to the reformer 10 from the fluid line 201, thereby heightening the temperature of the reformer 10 so as to obtain a reformed gas whose $H_2$ concentration is high and hydrocarbon concentration is low. This suppresses the internal reformation, thereby raising the temperature of the module. Conversely, when the temperature of the fuel cell is required to be lowered, the low-temperature fluid is supplied to the reformer 10 from the fluid line 201, thereby lowering the temperature of the reformer 10 so as to obtain a reformed gas whose $H_2$ concentration is low and hydrocarbon concentration is high. This promotes the internal reformation, thereby lowering the temperature of the module.

Figure 6:
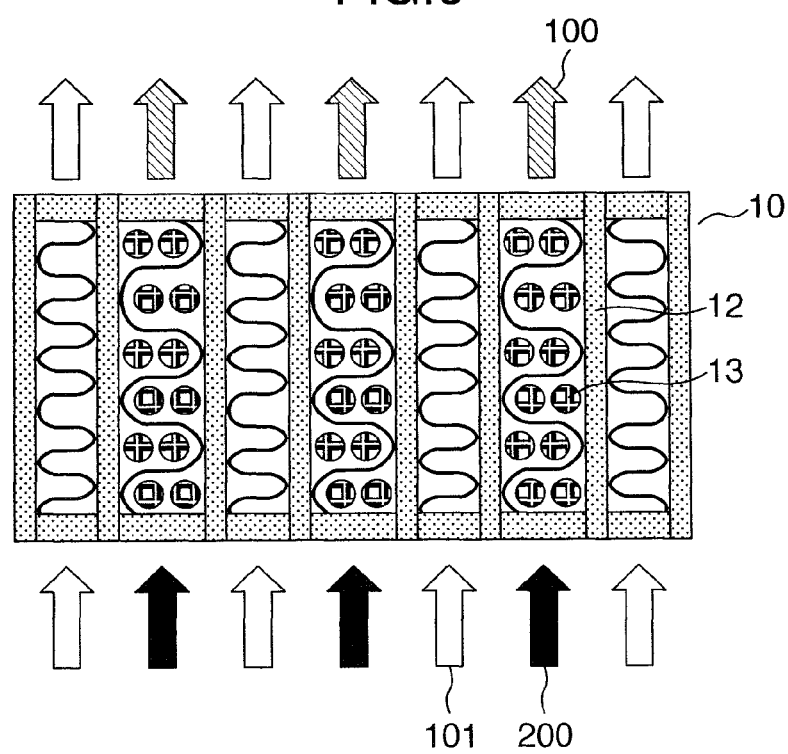
FIG. 6 is a schematic diagram for illustrating an example of the reformer for performing the reformation with the use of an exhaust gas alone.
Figure 7:
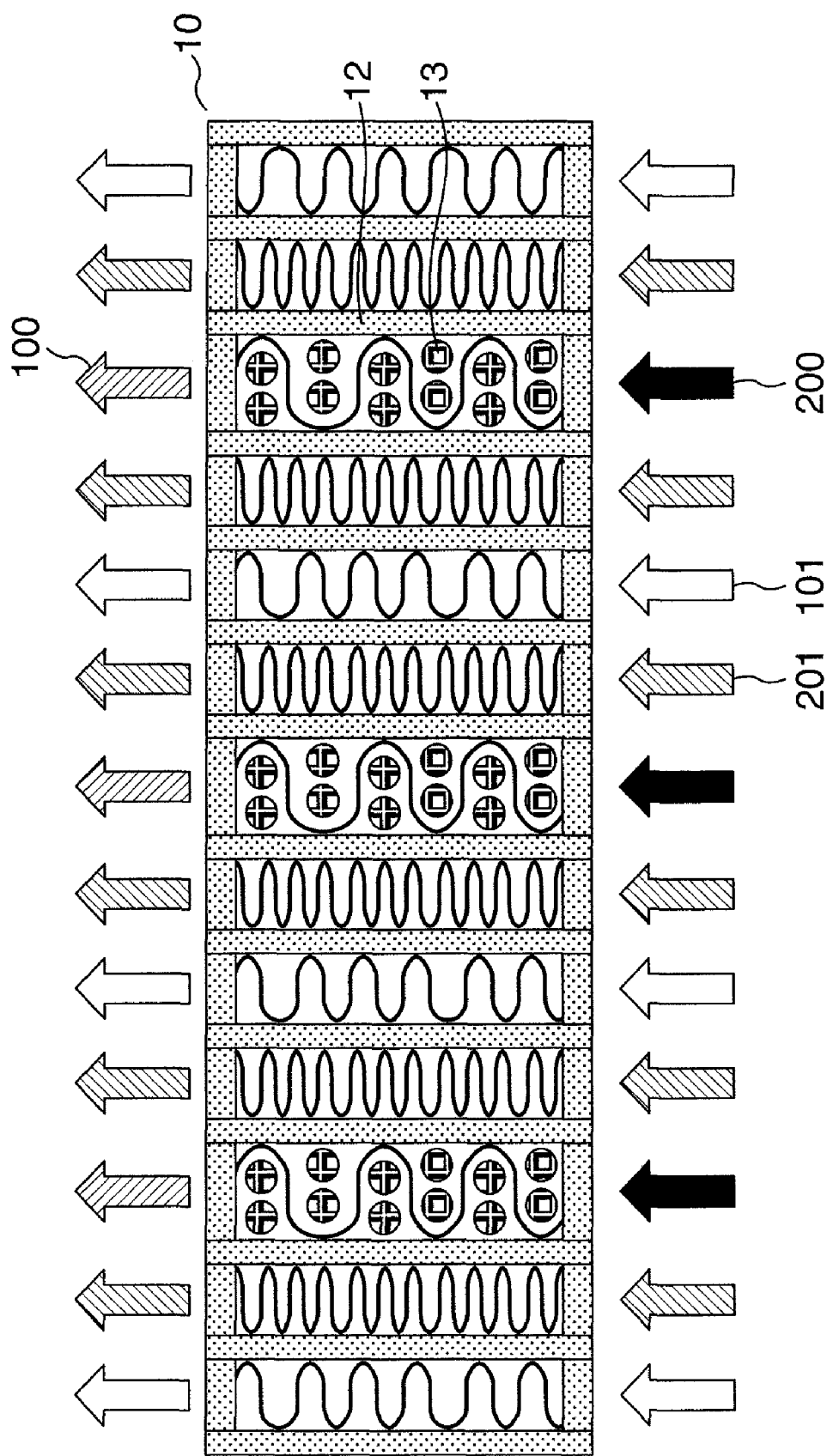
FIG. 7 is a schematic diagram for illustrating an example of the reformer according to the present invention.

FIG. 6 illustrates an example of the reformer for performing the reformation under the temperature provided by the exhaust gas 101 alone. Also, FIG. 7 illustrates an example of the reformer which includes the fluid line 201. In the case of the reformer for performing the reformation under the temperature from the exhaust gas 101 alone, the to-be-reformed gas 200 produced by adding the water vapor to the hydrocarbon-based fuel is supplied to the reformer 10. Then, the reformer 10 collects the heat of the exhaust gas 101 alone by segregation walls 12, thus obtaining the reformed gas 100. Incidentally, flow channels for the to-be-reformed gas 200 in the reformer are filled with reformation catalysts 13 for promoting the reformation reactions generally. Usually, Ni or Ru-based catalysts are used as these reformation catalysts 13.

In contrast thereto, in the present invention, the high-temperature or low-temperature fluid can be supplied to the reformer 10 via the fluid line 201. This high-temperature or low-temperature fluid makes the temperature of the reformer 10 controllable regardless of the temperature of the exhaust gas 101, i.e., the operation state of each fuel cell 80. Incidentally, the temperature of the reformer 10 refers to temperature of the reformation catalysts 13.

The structure of the reformer 10 is not limited to the structure illustrated in FIG. 7. The structure illustrated in FIG. 7, however, is preferable, since response to the temperature control over the reformation catalysts 13 becomes faster. This is because the configuration illustrated in FIG. 7, where the flow channels for the to-be-reformed gas 200 and flow channels for the fluid supplied from the fluid line 201 are adjacent to each other with the segregation walls 12 located therebetween, and where flow channels for the exhaust gas 101 are provided outside the flow channels for the fluid supplied from the fluid line 201, includes the flow channels for the temperature raising/lowering fluid in proximity to the reformation catalysts 13. As a result, the above-described response becomes faster.

Figure 8:
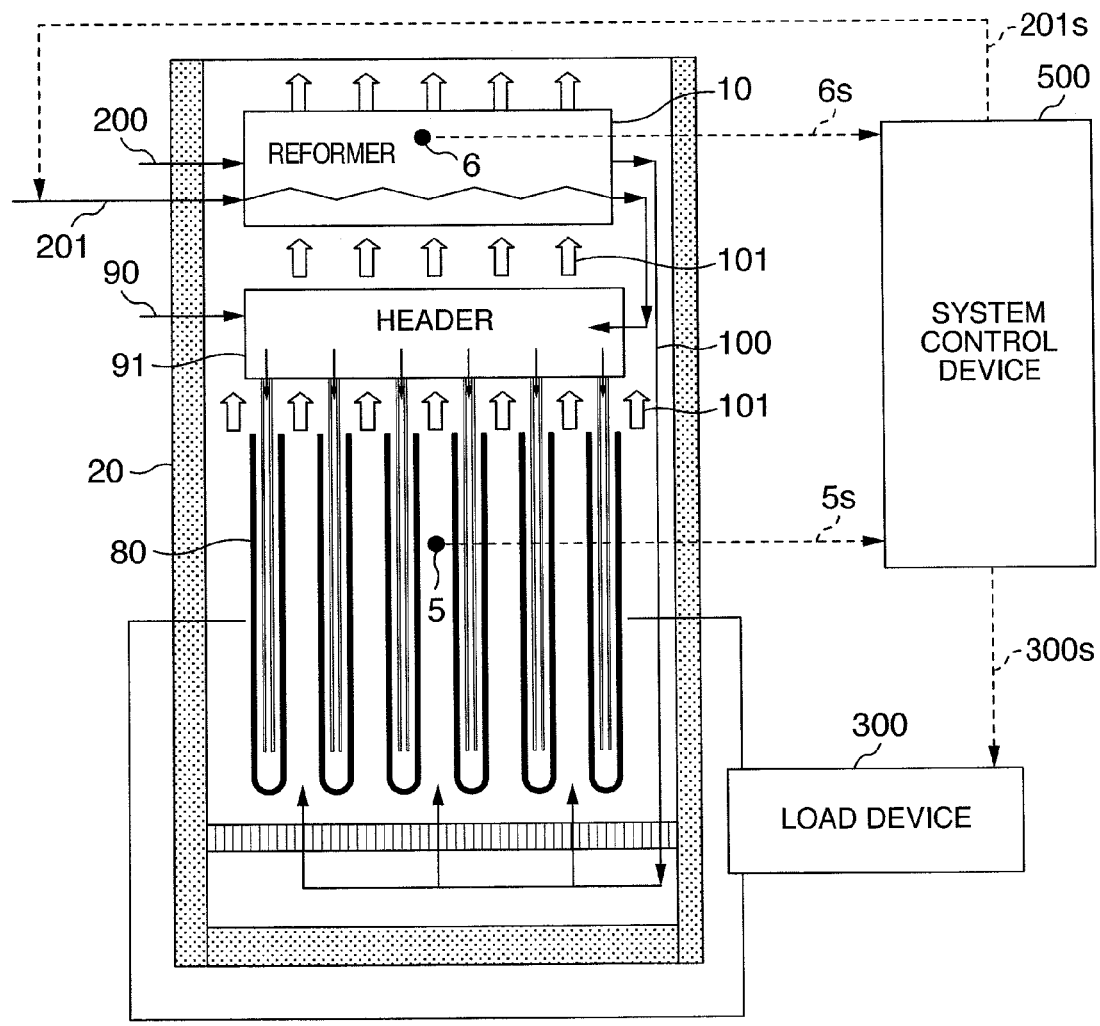
FIG. 8 is a schematic diagram for illustrating the configuration of a control channel in the fuel cell power generation system of the present invention.

FIG. 8 illustrates an example of the control channel in the solid-oxide fuel cell power generation system of the configuration illustrated in FIG. 1. Here, the temperature 5 of each fuel cell 80 is represented by a signal 5s, and the temperature 6 of the reformer 10 is represented by a signal 6s. When these signals are transmitted to a system control device 500, the system control device 500 controls temperature and flow quantity of the fluid line 201 by transmitting a signal 201s. Also, the device 500 transmits a signal 300s to a load device 300, thereby controlling the power generation amount of the fuel cell. This load device 300 is a device for extracting the DC current, which is acquired by the electrochemical reaction in the formula (2) or the formula (3), from the module 30, i.e., the assembly of the fuel cells 80. It turns out that this DC-current amount is controlled using the signal 300s. Usually, a DC-AC converter for converting the DC current into an AC current is provided inside the load device 300. Accordingly, the DC current is converted into the AC current, then being supplied to users and businesses concerned with the system.

Figure 10:
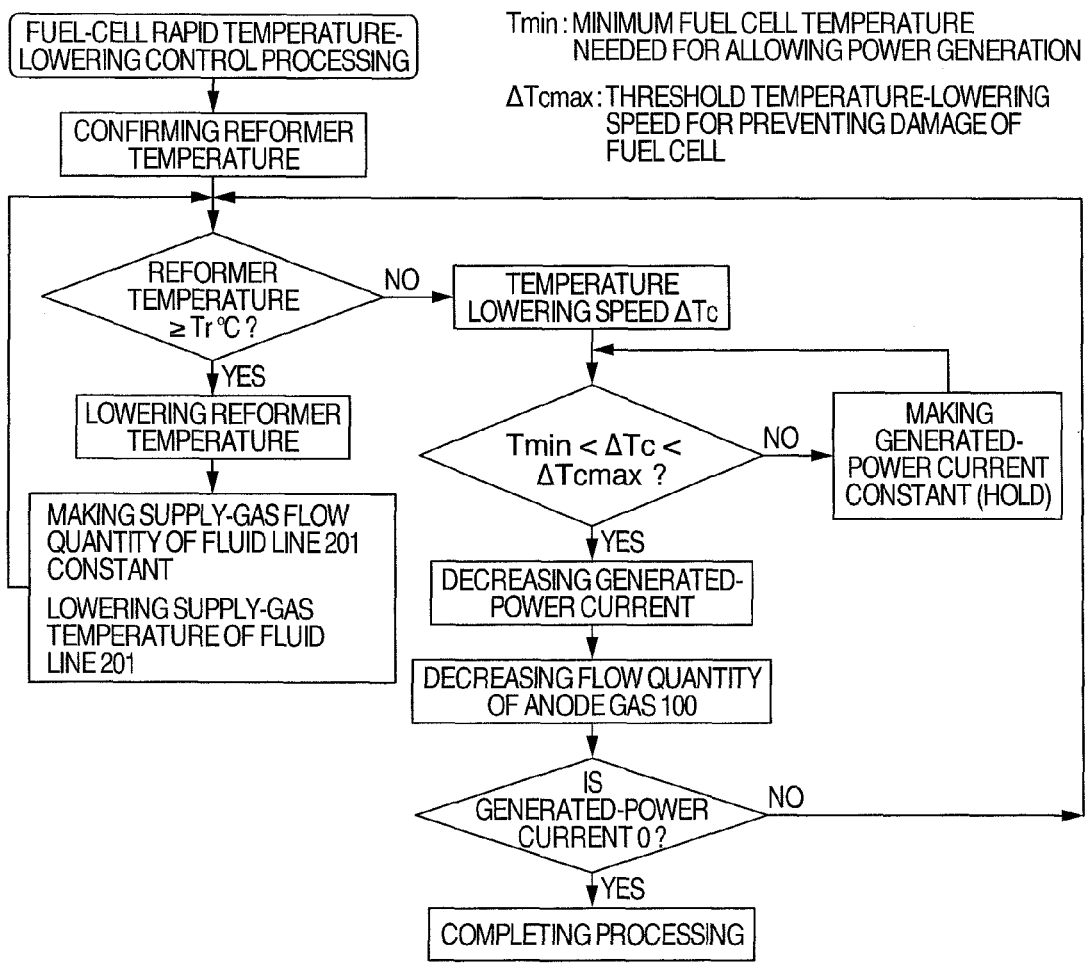
FIG. 10 is a flowchart of a rapid temperature-lowering control processing, which is a temperature control over the reformer.
Figure 11:
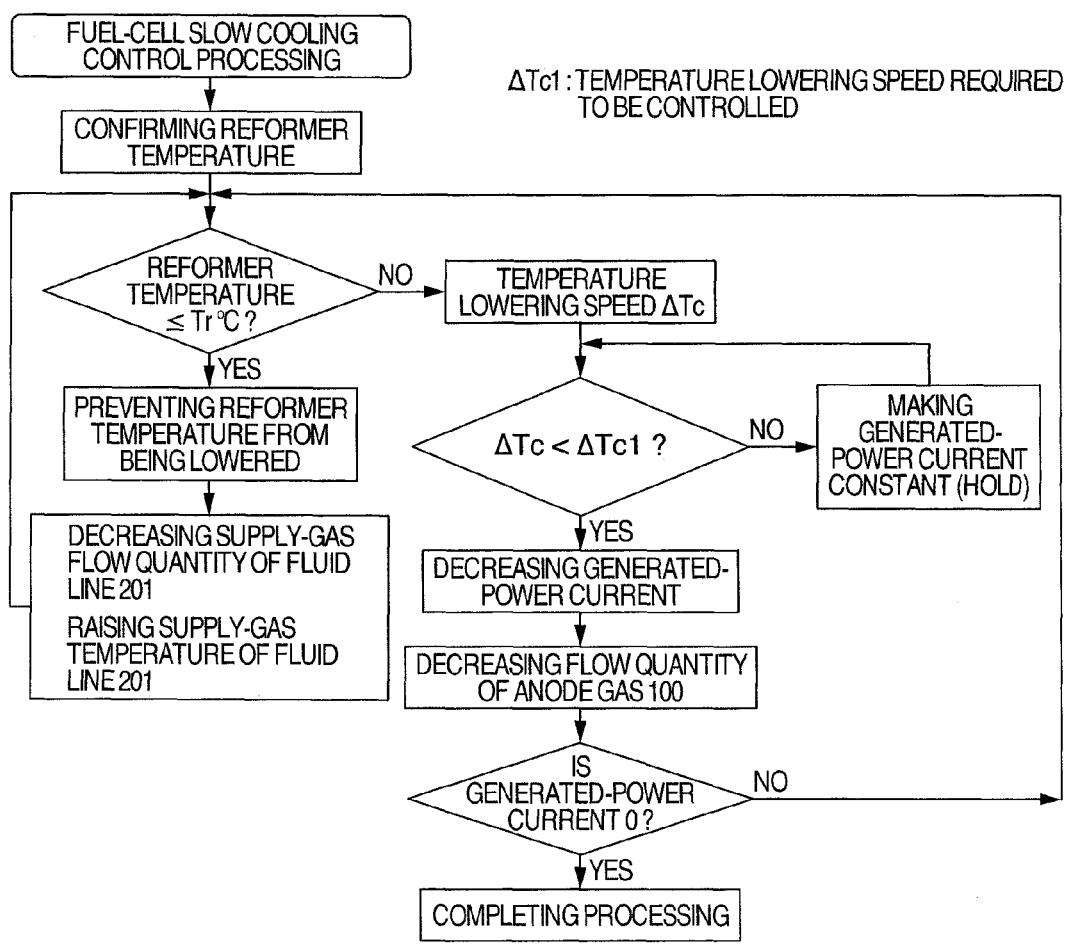
FIG. 11 is a flowchart of a slow cooling control processing, which is a temperature control over the reformer.
Figure 12:
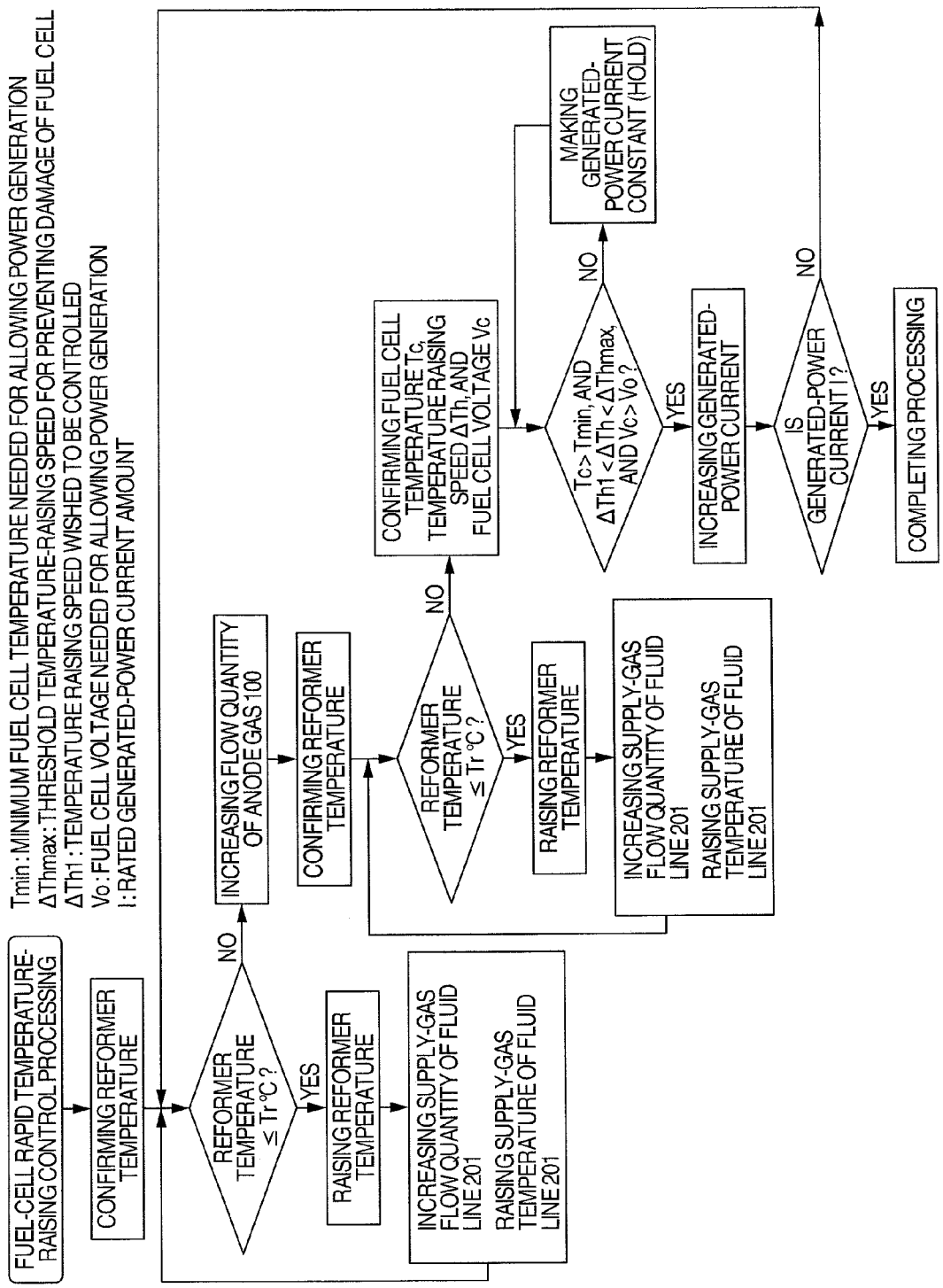
FIG. 12 is a flowchart of a rapid temperature-raising control processing, which is a temperature control over the reformer.

In the operation of the fuel cell power generation system, there are some cases where the temperature of the reformer is wished to be controlled in response to the temperature or load of the module. Also, there are some cases where the temperature raising/lowering speed of the module is wished to be controlled. When there is need of lowering the temperature of the module, a low-temperature fluid is supplied to the reformer 10 from the fluid line 201, then controlling at least either of the temperature and the flow quantity of the low-temperature fluid. This lowers the temperature of the reformer 10, thereby making it more difficult for the reformation reaction to proceed. Accordingly, the $CH_4$ concentration is heightened, and thus it becomes easier for the internal reformation to proceed. Conversely, when there is need of raising the temperature of the module, a high-temperature fluid is supplied to the reformer 10 from the fluid line 201, then controlling at least either of the temperature and the flow quantity of the high-temperature fluid. This heightens the $H_2$ concentration and lowers the $CH_4$ concentration, thereby making it more difficult for the internal reformation to proceed. As indicated in Table 1, these controls allow implementation of controls such as rapid temperature lowering, slow cooling, and rapid temperature raising. FIG. 10 through FIG. 12 respectively illustrate control flowcharts for each of the rapid temperature lowering, the slow cooling, and the rapid temperature raising indicated in Table 1.

With respect to the rapid temperature lowering illustrated in FIG. 10, the temperature of the reformer is monitored. Then, if the reformer temperature is equal to or higher than Tr, the supply-gas flow quantity of the fluid line 201 is made constant. Thus, a gas whose flow quantity is made constant and also whose temperature is lowered is supplied to the reformer, thereby lowering the reformer temperature. In this way, if the reformer temperature becomes lower than Tr, the $CH_4$ concentration is increased, and thus the temperature lowering in the fuel cell proceeds. Moreover, the generated-power current is decreased so that the temperature lowering speed will not exceed a temperature lowering speed $\Delta Tcmax$ for preventing damage of the fuel cell. This allows accomplishment of the rapid temperature lowering.

With respect to the slow cooling illustrated in FIG. 11, the reformer temperature is monitored. Then, if the reformer temperature is lower than Tr, the supply-gas flow quantity of the fluid line 201 is decreased. Thus, a gas whose flow quantity is decreased and also whose temperature is raised is supplied to the reformer, thereby raising the reformer temperature. In this way, if the reformer temperature becomes higher than Tr, the $CH_4$ concentration is decreased, and thus the temperature lowering in the fuel cell can be prevented. Moreover, the generated-power current is made constant or is decreased so that the temperature lowering speed will fall within a temperature lowering speed $\Delta Tc1$ which is wished to be controlled. This allows accomplishment of the slow cooling.

With respect to the rapid temperature raising illustrated in FIG. 12, the reformer temperature is monitored. Then, if the reformer temperature is lower than Tr, the supply-gas flow quantity of the fluid line 201 is increased. Thus, a gas whose flow quantity is increased and also whose temperature is raised simultaneously is supplied to the reformer, thereby raising the reformer temperature. Moreover, flow quantity of the anode gas 100 is increased in order to increase the generated-power current. Then, if it is found that the reformer temperature satisfies a condition of being higher than a threshold value Tr, the generated-power current is increased while monitoring the fuel cell temperature and the fuel cell voltage so that the temperature raising speed will not exceed a temperature raising speed $\Delta Thmax$ for preventing damage of the fuel cell. This allows accomplishment of the rapid temperature raising.

Incidentally, each of the flowcharts illustrated in FIG. 10 through FIG. 12 is, after all, just one example. For example, the reformer temperature Tr need not be the fixed value, and may be set as being a value corresponding to the fuel cell temperature or the temperature raising/lowering speed at that time. In the present invention, the control like this becomes implementable, because there is provided the member for making the reformer temperature controllable independently of the fuel cell temperature.

In a common solid-oxide fuel cell power generation system, $H_2$ is supplied to flow channels for the anode gas at the time of raising the module temperature in order to accelerate the power generation. In the present invention, however, the anode gas with the high $H_2$ concentration is supplied. As a result, the supply of $H_2$ can be made unnecessary. Also, the temperature lowering is implemented by purging $N_2$ and $H_2$ at the time of lowering the module temperature in order to prevent oxidation of the anode. In the present invention, however, the anode gas with the high $CH_4$ concentration is supplied at the time of lowering the module temperature. As a result, this purge quantity can be reduced, or the purge itself can be made unnecessary.

TABLE 1

| | control items | | | items to be controlled | | |
|---|---|---|---|---|---|---|
| | supply-gas flow quantity Q of fluid line 201 | supply-gas temperature T of fluid line 201 | power generation amount | reformer temperature | $CH_4$ concentration | control effects |
| Rapid temperature lowering | constant | low | low or 0 | low | large | temperature lowering speed is made large by increasing internal reformation amount in module |
| slow cooling | small | high | constant or low | high | small | temperature lowering speed is made small by decreasing internal reformation amount in module |
| Rapid temperature | large | high | constant or large | high | small | temperature raising speed is made large |

TABLE 1-continued

| | control items | | items to be controlled | | |
|---|---|---|---|---|---|
| supply-gas flow quantity Q of fluid line 201 | supply-gas temperature T of fluid line 201 | power generation amount | reformer temperature | CH$_4$ concentration | control effects |
| raising | | | | | by decreasing internal reformation amount in module |

[Embodiment 2]

Figure 9:
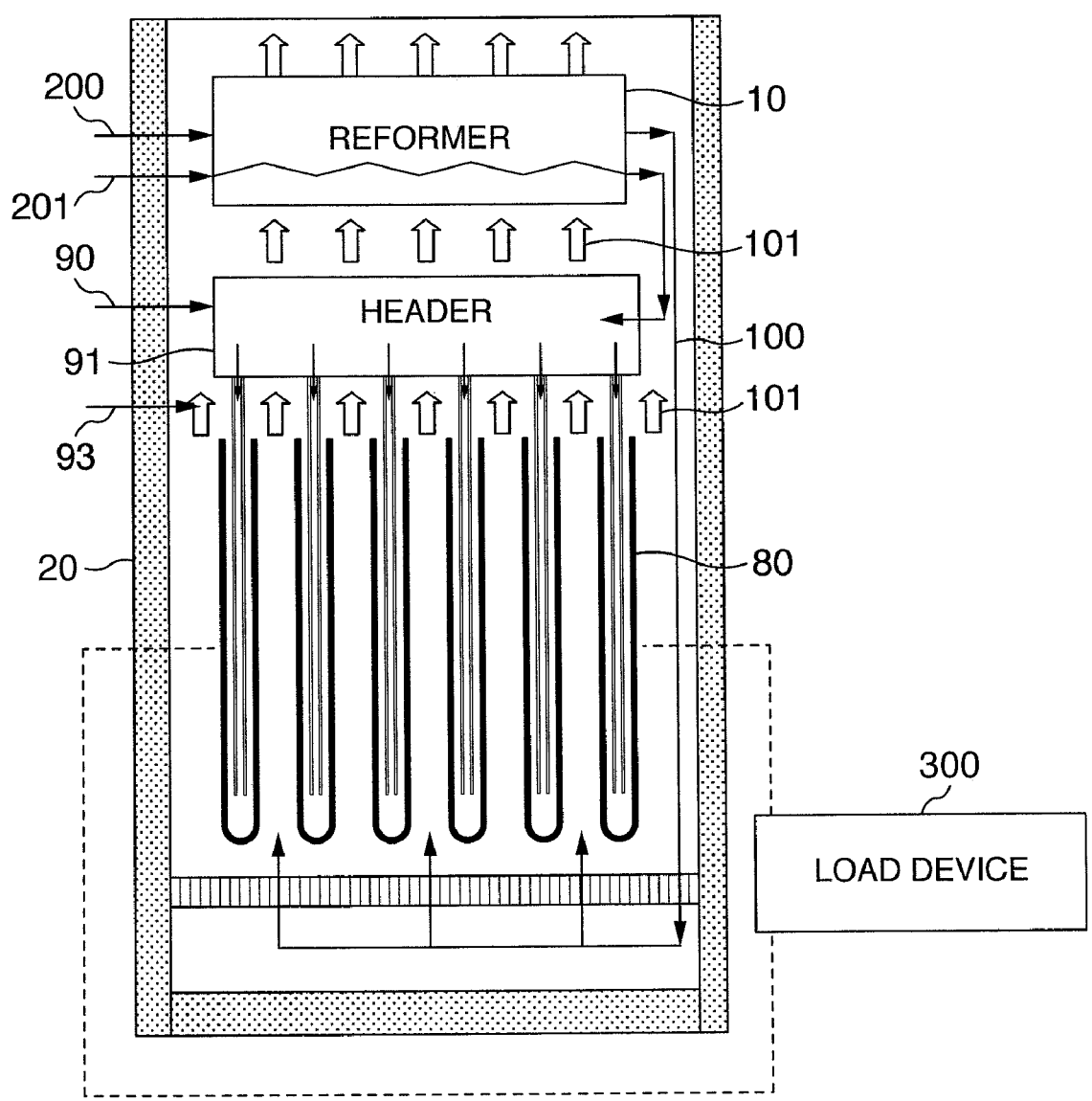
FIG. 9 is a schematic configuration diagram of the solid-oxide fuel cell power generation system according to another embodiment of the present invention.

FIG. 9 illustrates a modification embodiment of the one illustrated in FIG. 1. In the configuration of this embodiment, a gas supplied from another fluid line 93 is mixed with the exhaust gas 101, thereby making it possible to actively cool or heat the exhaust gas 101. As the gas supplied from the fluid line 93, i.e., the gas mixing member, in the case of raising the temperature of the exhaust gas 101, it is preferable to supply, e.g., a gas heated by heater or a combustion gas combusted using burner. Also, in the case of lowering the temperature of the exhaust gas 101, it is preferable to supply, e.g., air. The operation like this makes the temperature of the exhaust gas 101 controllable regardless of the temperature of each fuel cell 80. As a consequence of this, it becomes possible to accomplish the independent control over the reformer temperature.

Incidentally, in the embodiments given so far, the explanation has been given using the cylinder-shaped solid-oxide fuel cell. The essence of the present invention, however, is that the temperature of the reformer is independently controlled regardless of the operation state of each fuel cell. Accordingly, it is needless to say that the present invention is also applicable to the case of a flat-plate-shaped solid-oxide fuel cell other than the cylinder-shaped one. Also, it is needless to say that, concerning the configuration for controlling the temperature of the reformer, various modifications are also possible within the range not departing from the contents of the present invention. The solid-oxide fuel cell power generation system of the present invention allows accomplishment of the efficiency enhancement. This feature makes the system available as a distributed power-supply system which is friendly to the terrestrial environment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of operating a fuel cell power generation system which heats a reformer with an exhaust gas of a fuel cell module, wherein
   the reformer has a structure of a three-fluid heat exchanger which includes a flow channel for to-be-reformed gas having a reformation catalyst, a flow channel for the exhaust gas and a flow channel for fluid whose temperature is higher or lower than temperature of the exhaust gas, the flow channel for the to-be-reformed gas and the flow channel for the fluid whose temperature is higher or lower than temperature of the exhaust gas being adjacent to each other with a first segregation wall located therebetween,
   the method comprising a step of:
   controlling temperature of the reformer by supplying to the three-fluid heat exchanger of the reformer the fluid whose temperature is higher of lower than temperature of the exhaust gas in response to temperature or load of the fuel cell module.

2. The method according to claim 1, wherein
   a fuel to be reformed by the reformer is a hydrocarbon-based fuel, the fuel cell module including a solid-oxide fuel cell module,
   the method, further comprising a step of:
   controlling reformation reaction of the fuel cell module by adjusting the temperature of the reformer, and thereby adjusting hydrocarbon concentration of a reformed gas.

3. The method according to claim 1, wherein in the step of controlling the temperature of the reformer,
   the temperature of the reformer is controlled by adjusting temperature and/or flow quantity of the fluid whose temperature is higher or lower that temperature of the exhaust gas to be introduced into the three-fluid heat exchanger.

4. The method according to claim 1, wherein in the reformer having a structure of the three-fluid heat exchanger, the flow channel for the exhaust gas is structurally separated from the flow channel for the fluid whose temperature is higher or lower than temperature of the exhaust gas.

5. The method according to claim 1, wherein the flow channel for the exhaust gas and the flow channel for the fluid whose temperature is higher or lower than temperature of the exhaust gas are adjacent to each other with a second segregation wall located therebetween.

6. The method according to claim 5, wherein the flow channel for the to-be-reformed gas is not interposed between the flow channel for the exhaust gas and the flow channel for the fluid whose temperature is higher or lower than temperature of the exhaust gas.

7. The method according to claim 1, wherein the flow channel for the exhaust gas is not interposed between and the flow channel for to-be-reformed gas and the flow channel for the fluid whose temperature is higher or lower than temperature of the exhaust gas.

8. A method of operating a fuel cell power generation system which heats a reformer with an exhaust gas of a fuel cell module, wherein
   the reformer has a structure of a three-fluid heat exchanger which includes a flow channel for to-be-reformed gas having a reformation catalyst, a flow channel for the exhaust gas and a flow channel for fluid whose temperature is higher or lower than temperature of the exhaust gas, the flow channel got the to-be-reformed gas and the flow channel for the fluid whose temperature is higher or lower than temperature of the exhaust gas being adjacent to each other with a segregation wall located therebetween,
   the method, comprising a step of:

controlling temperature raising/lowering speed of the module by supplying to the three-fluid heat exchanger of the reformer the fluid whose temperature is higher of lower than temperature of the exhaust gas, and thereby adjusting hydrocarbon concentration of a reformed gas.

9. A method of operating a fuel cell power generation system which heats a reformer with an exhaust gas of a fuel cell module, wherein the reformer has a structure of a three-fluid heat exchanger which includes a flow channel for to-be-reformed gas having a reformation catalyst, a flow channel for the exhaust gas and a flow channel for fluid whose temperature is higher or lower than temperature of the exhaust gas, the flow channel for the to-be-reformed gas and the flow channel for the fluid whose temperature is higher or lower than temperature of the exhaust gas being adjacent to each other with a segregation wall located therebetween, the method, comprising a step of:

performing a control that, if there is need of lowering temperature of the fuel cell module, temperature of the reformer is lowered by supplying to the three-fluid heat exchanger of the reformer the fluid whose temperature is lower than temperature of the exhaust gas to increase hydrocarbon concentration in a reformed gas, and conversely, if there is need of raising the temperature of the fuel cell module, the temperature of the reformer is raised by supplying to the three-fluid heat exchanger of the reformer the fluid whose temperature is higher than temperature of the exhaust gas to decrease the hydrocarbon concentration.

\* \* \* \* \*